United States Patent
Krenzer et al.

Patent Number: 5,820,316
Date of Patent: Oct. 13, 1998

[54] GUIDE ELEMENT FOR A CUTTING TOOL

[75] Inventors: Ulrich Krenzer, Zirndorf; Wolfgang Hitz, Brombuhlweg, both of Germany

[73] Assignee: Kennametal Hertel AG, Furth, Germany

[21] Appl. No.: 656,239

[22] PCT Filed: Dec. 15, 1994

[86] PCT No.: PCT/EP94/04155

§ 371 Date: Jun. 11, 1996

§ 102(e) Date: Jun. 11, 1996

[87] PCT Pub. No.: WO95/16535

PCT Pub. Date: Jun. 22, 1995

[30] Foreign Application Priority Data

Dec. 16, 1993 [DE] Germany ............. 93 19 354 U

[51] Int. Cl.⁶ ............ B23B 41/02; B23B 51/00
[52] U.S. Cl. ............ 408/83; 175/325.1; 175/399; 411/16; 411/396; 411/929.1; 408/143; 408/705
[58] Field of Search ............ 408/83, 143, 705; 175/325.1, 399, 408; 411/16, 17, 55, 59, 178, 929.1, 396, 397, 373; 269/303, 315

[56] References Cited

U.S. PATENT DOCUMENTS

| | | | |
|---|---|---|---|
| 1,809,620 | 6/1931 | Cole | 411/929.1 |
| 2,334,795 | 11/1943 | Smith | 408/83 |
| 2,874,741 | 2/1959 | Brancato | 411/929.1 |
| 3,529,508 | 9/1970 | Cooksey | 411/397 |
| 4,040,326 | 8/1977 | Breed | 411/929.1 |
| 4,096,771 | 6/1978 | Monro | 408/83 |
| 5,183,358 | 2/1993 | Foulkes, Jr. et al. | 411/59 |
| 5,425,604 | 6/1995 | Scheer et al. | 408/83 |

Primary Examiner—Steven C. Bishop
Attorney, Agent, or Firm—John M. Vasuta

[57] ABSTRACT

Guide element for a cutting tool having a location hole (20) in the tool shank (4) having an internal thread (16, 10), which has a threaded bolt (14) having an external thread that can be screwed into the internal thread (16, 10) and is spring mounted in the screw-in direction when screwed in, and a guide head (13) fixed to a free end of the threaded bolt (14) and operating in the manner of a sliding rail.

20 Claims, 5 Drawing Sheets

GUIDE ELEMENT FOR A CUTTING TOOL

BACKGROUND OF THE INVENTION

The invention relates to a guide element for a cutting tool. The problem with cutting tools, in particular when cutting bores of a large diameter, is that the cut does not run concentrically and that it is therefore not always possible to make a perfectly cylinder-shaped bore hole. Instead, the bore hole has an irregular polygonal profile. This "non-round" cross-section of the bore hole is transferred back to the tool during further machining operations. As a result, the tool does not run "round", but instead, due to the irregular cross-section of the bore hole, it continually swings out of concentricity and tries to follow the irregular polygonal course. Furthermore, in the case of long narrow cutting tools, the cutting forces that arise through the inherent rigidity of the tool cannot be satisfactorily contained. This can result in critical strain on the tool.

In order to minimize the described irregular course of the tool and to prevent critical strain on the tool, the prior art uses guide elements on the external sides of the tool. These guide elements support the tool in a radial direction on the internal walls of the bore hole already created by the leading cut in each case. This support provides the tool with additional stabilization against deformations and also effectively reduces the undesired irregular course of the tool.

In order to improve the concentricity of the tool, the prior art publication DE-A42 14 528, for example, discloses a pilot or center drill being attached to the main cutter. This pilot or center drill centers the tool in the bore hole. The problem, however, is that, as the tool is being removed from the bore hole, the pilot or central drill comes out of the pilot or central bore hole, with the result that the tool again tends to run irregularly while it is being removed. For this reason, this prior art tool also has the afore-mentioned guide elements arranged radially on the peripheral edges of the tool. The disadvantage of these prior art guide elements is that they are complicated to assemble. Even the insertion of the guide elements into the tool presents assembly problems. In addition, it is very difficult to set and adjust the tools.

For finish cutting, the surface and the form evenness is usually very good. There is therefore not very much strain on the guide elements. In the case of rough cutting, however, problems with the guide elements often arise as a result of both the bore surface as well as the unevenness of the bore shape. In particular, problems arise when boring with bore tools that are equipped with indexable inserts. The surface of the bore internal wall becomes severely scratched as a result of the large volume of chips that occur through the cutting. The surface quality of the bore hole is therefore greatly reduced. Surface flaws that occur in this way cause the guide element to run irregularly on the bore internal wall, thereby giving rise to undesired natural vibrations in the tool. Moreover, the large volume of chips means that the chips push the tool away from its rotating longitudinal direction and cause the tool to run in a "non-round" manner. Both effects cause flaws in the contour or the shape of the bore hole.

As a result, the guide elements following the cutters in each case have to be sufficiently robust and shock-resistant to withstand the mechanical strain caused by the flaws. In order to prevent abrasion of the guide elements against the bore walls, which become rough through the scratching, the guide elements have to be hard and resistant to wear and tear. In addition, it is advantageous if the guide elements can offset the tolerance errors in size and shape which always occur as a result of changing the indexable inserts.

Finally, long internal-processing tools are often very sensitive to vibrations. However, the guide elements must not transfer the vibrations originating from the cutter to the work piece. Instead, the guide elements should offset as much as possible the vibrations coming from the cutter, or at least cushion them.

Another problem is the restricted space available for mounting the guide elements. It therefore becomes very difficult to manage the guide elements in such a small area. As a result, the guide elements can usually only be mounted with special tools. However, the disadvantage with these special tools is that too much surface pressure is exerted on the small body of the guide element. The guide-element body is therefore often damaged during the mounting stage, which decreases the service life of the guide element to a considerable extent.

SUMMARY OF THE INVENTION

On the basis of these disadvantages, the object of the invention is to improve a guide element with respect to its usage characteristics.

This object is attained through the combination of features in the invention. To this end, the tool shank of the cutting tool has a normally radial location hole with an internal thread. A threaded bolt having an external thread can be screwed into the internal thread. The internal thread is designed such that the threaded bolt is spring mounted in the screw-in direction. Angular threads are particularly suitable for the internal thread of the thread holder. Such angular threads are a commercial standard, so the associated threaded bolts are readily available. Finally, a guide head is fixed to the free end of the threaded bolt protruding from the location hole. This guide head operates in the manner of a guide rail.

Due to the fact that the guide element can be screwed in, the guide element can be easily assembled and, once it is in the mounted state, it can also be easily set and adjusted. The internal thread is designed to spring mount the threaded bolt such that, on the one hand, the threaded bolt securely holds itself in the thread and, on the other hand, the threaded bolt is prevented from slipping through the threads of the internal thread by spring mounting the threaded bolt in a radial direction of the tool.

The functioning of the guide element is based on the fact that the threaded bolt operates with its attached guide head as a guide body. During the machining process, the guide head lies evenly on the bore internal wall. If force is exerted on the guide body as a result of an irregularity on the surface of the bore internal wall or in the bore contour, the guide body, being screwed in to its nominal depth, continues to penetrate resiliently into the location hole in a radial direction. Once the irregularity has been overcome, i.e. no more force is exerted on the guide body, it simply springs-back to its original position. The guide body therefore slides out of the thread again by the amount it had been inserted.

The thread is designed as a thread holder that can be inserted into the location hole. The thread holder is slotted lengthwise and can be spread by screwing in the threaded bolt. Preferably, the thread holder lies in a press-fitting manner with the locating faces on its outer wall against the internal wall of the location hole. As a result of the expansion force exerted on the threaded bolt, the thread holder is also braced against the bore internal wall. If a force directed in the radial direction of the tool or in the screw-in direction of the guide body is exerted on the guide body comprising the guide head and the threaded bolt, the thread holder is expanded to a pre-defined extent such that the guide body can project deeper in the screw-in direction into the thread holder and thereby into the location hole. When the force exerted is removed, the thread holder contracts its spring-mounted formation by itself and allows the guide body to slide out again by the same distance, against the screw-in direction radial to the tool.

Two opposite longitudinal slots are inserted into the thread holders. These longitudinal slots divide the thread holder into two opposite expandable thread shanks. This arrangement of the longitudinal slots has a particularly advantageous spring effect and thereby a well directed strain of the thread holder. This arrangement offsets tolerance errors in terms of the shape and measurement of the bore as well as effectively reduces the vibrations produced by the cutter. Any number of longitudinal slots can be made in the thread holder.

The invention further relates to the additional utilization of the prestress force of the threaded bolt in the thread holder to positively fix the thread holder in the location hole. The spring constants of the thread holder are prestressed must be selected such that the thread holder can be spread apart to a greater extent than the prestressed amount.

The insertion of vibration-reducing material into the hollow space between the thread holder and the location hole, can be used to create an additional damping effect. Moreover, the material parameters of the damping mass can be used to select the damping mass such that the spring constants of the thread holder can also be influenced, and thereby adjusted. The spring constants of the thread holder can also be set by varying the filling pressure of the vibration-reducing material in the hollow space.

A further, independent embodiment is presented that is an alternative to the previous embodiment of the internal thread. In this second embodiment, a spiral-spring-like, helix-shaped wire insert is inserted into the location hole. The individual threads of the wire insert here form the threads of the internal thread. The main advantage of these wire inserts is that they are commercially available, a factor that reduces costs and also make it easier to procure the wire inserts. The wire inserts are known, for example, by the name "HeliColl®" . These wires are twisted in a spiral shape. In the inserted state, the individual spirals of the wire insert for a thread path between themselves. Usually the "HeliColl®" inserts are used in automobile construction, for example, to replace a worn thread. The wire insert is simply inserted into the bore hole to substitute for the worn thread.

A special embodiment of the wire insert first described is also disclosed. This wire insert contains a thread path or several thread paths of which the cross-section form a polygon instead of a circle. The polygonal thread paths thus formed have a plurality of polygon corners. The areas of the polygonal thread paths between the polygon corners are formed as flat surfaces with an even section. These flat thread paths between the polygon corners operate in the manner of radial leaf springs. As soon as the threaded bolt is hit with a force in the screw-in direction radial to the tool, the threaded bolts press against the flat areas of the polygon, whereby the spring areas of the polygon spring outwardly in the manner of a leaf spring. The polygonal thread paths achieve the same spring effect as is shown in the slotted embodiments with a thread holder. In addition, the application of a plurality of polygonal embodiments with a thread holder has the advantage of efficiently preventing the threaded bolt from slipping through in the screw-in direction. Moreover, the application of a spiral-shaped internal profile on the internal wall of the location hole helps to hold the wire insert in the location hole and thereby indirectly improves the positioning of the guide element in the tool.

The invention further includes a formation of the guide head that is inventive in itself and is independent of the other form of the guide element. A commercially available threaded bolt can be used. This threaded bolt preferably has an angular thread as the external thread. Moreover, a hexagon socket is preferably molded in the free end of the threaded bolt. This hexagon socket that is already molded in commercially available threaded bolts is used in Patent Claim 12 to attach the guide head. To this end the guide head is more or less mushroom shaped. The "stem" protruding from the "cap" also forms a hexagonal mounting shaft. The mounting shaft molded to the guide head is thereby a hexagon insert bit. This hexagon insert bit is adapted exactly to fit into the hexagon socket of the threaded bolt. The mounting shaft designed as a hexagon insert bit thus easily fits into the hexagon socket at the free end of the threaded bolt. The hexagon insert bit and the hexagon socket can be permanently joined together by sticking, soldering or compressing or any other positive connection. This connection can also be made with any other groove/spring-like combination of a bore hole in the free end of the threaded bolt having a mounting shank on the guide head together with a thread shank designed to complement the bore hole. Combinations of taper bores and taper shanks, cylinder bores and cylinder shanks, and multiple-cornered bores and multiple-cornered shanks are also possible.

The advantage of the 2-part formation of threaded bolts and guide head is that the guide head, can be made of a mechanically resistant material, preferably a hard metal, while a simple commercially available threaded bolt made of steel can be used as the threaded bolt. This also helps to reduce production costs.

Finally, the invention teaches how to improve the mounting characteristics of the guide body comprising the guide head and threaded bolt. The guide head is designed to complement a mounting tool. For example, it can be designed as a simple mounting plate that is adapted to a special mounting wrench. To this end, the guide head can, for example, be flattened on its sides. It is also possible to make holes in the guide head, preferably in the areas not operating as guide surfaces, into which holes a hole wrench can be inserted. The guide head can also be mounted with the hole wrench. The invention discloses a particularly simple and cost-efficient and therefore preferred embodiment. In this case, the guide head is designed in the manner of a domed cap nut. The convex-curved domed surface of the domed-cap-nut-like guide head hereby forms the actual guide surface, while the hexagon insert bit serves as the contact surface for a commercially available ring or fork wrench. A commercially available open-jawed or ring wrench that can even be purchased in DIY stores can be used to mount the threaded bolt via the guide-head hexagon insert bit (mounting hexagon) on the tool. This makes it very easy to twist the threaded bolt into the location hole to a pre-defined nominal depth. In addition, the threaded bolt can be easily set and adjusted with the guide head by means of a wrench. The additional advantage of using a ring wrench to adjust the threaded bolt is that, unlike the prior art mounting tools, no excessive surface pressure is exerted on the guide head. The guide head is therefore inserted without being damaged, which means that the entire service life of the guide head can be used on the tool.

Finally, a preferred combination of the guide element in accordance with the invention together with bore tools, counter-bore tools and friction tools is disclosed.

BRIEF DESCRIPTION OF THE DRAWINGS

The different embodiments of the invention are explained in more detail with the figures of the drawing. These show.

DETAILED DESCRIPTION OF THE INVENTION

Figure 1:
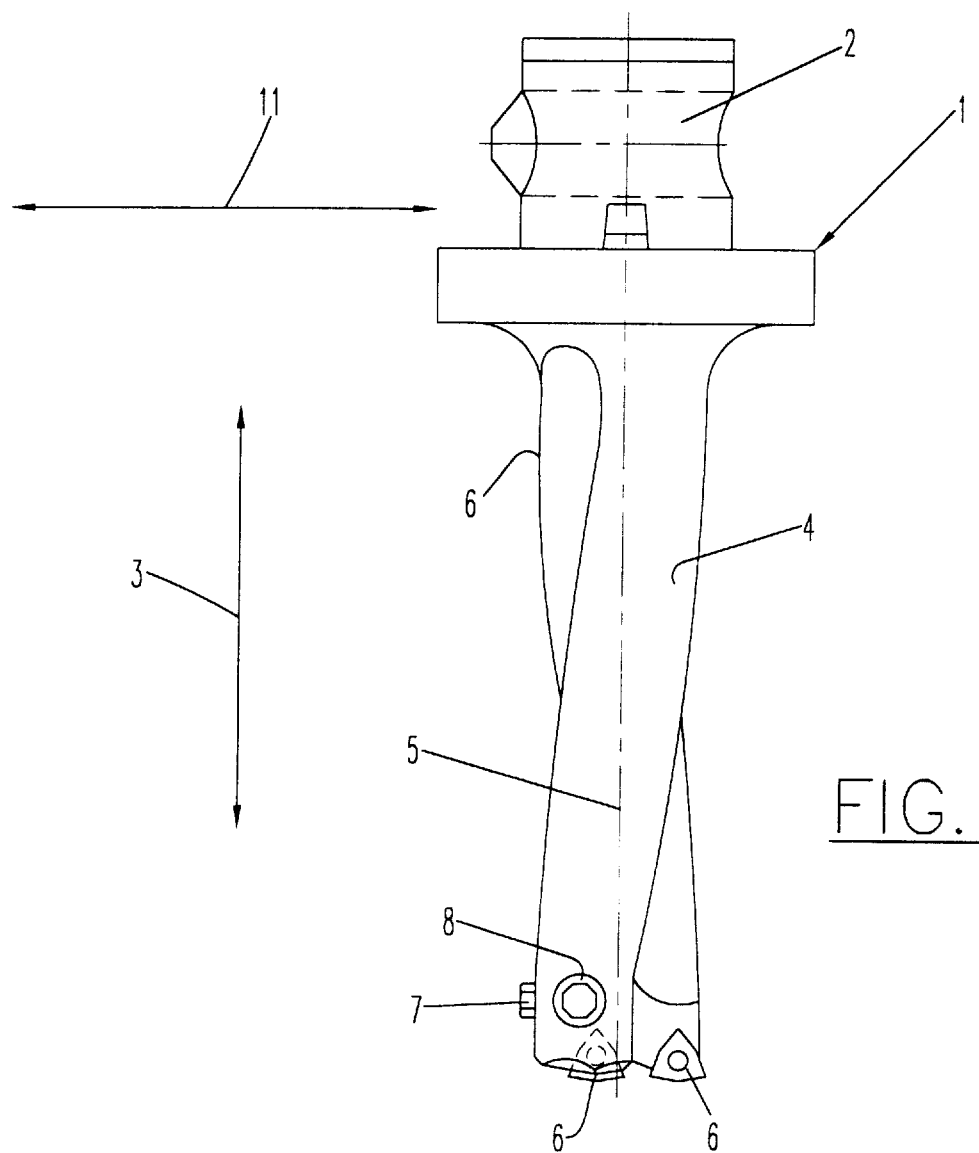
FIG. 1 a side view of a bore tool.

The bore tool 1 shown in FIG. 1 is fixed such that is can be detached by its tool holding fixture 2 to the tool machine not shown in the drawings. The shank 4 is connected in the lengthwise direction 3 to the tool holding fixture 2 on the bore tool 1. The central longitudinal axis 5 of the shank 4 is therefore congruent with the lengthwise direction 3 in FIG. 1. Finally, the indexable inserts 6 are attached, such that they can be detached, to the free ends of the bore tool 1 which face outwards in the lengthwise direction 3 of the tool holding fixture 2. At the same time, the indexable inserts 6 form the main cutting edges of the bore tool 1.

The guide elements 7 are inserted into the shank in a lengthwise direction 3 above the indexable inserts 6. The guide elements 7 comprise the guide body 8 and the internal thread designed as either a thread holder 9 or as a wire insert 10. The guide elements are arranged in the shank 4 of the bore tool 1 in a radial direction. The radial direction runs vertical to the central longitudinal axis 5 of the shank 4, i.e. in the transverse direction 11 also running vertical to the lengthwise direction 3.

Figure 2:
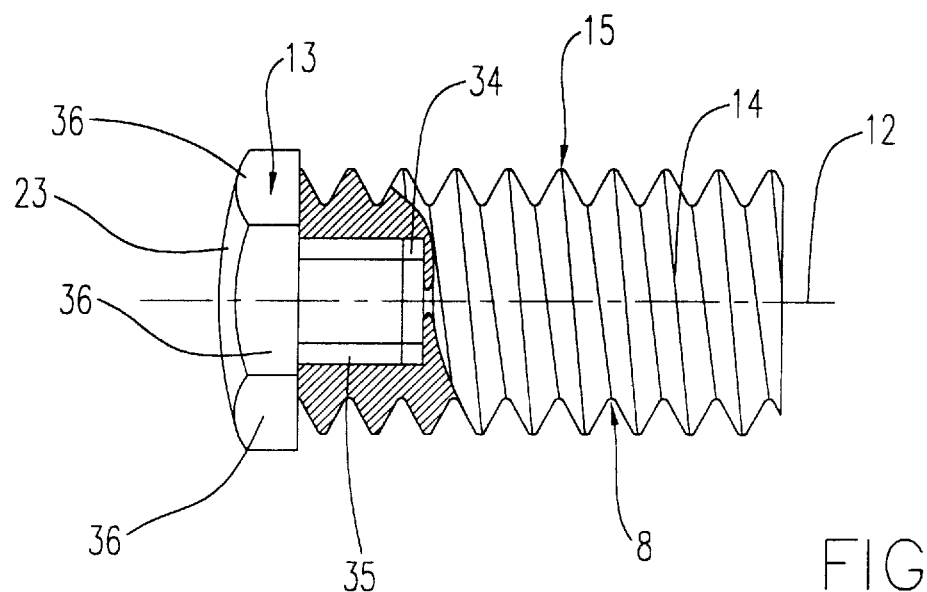
FIG. 2 the guide body comprising a guide head and a threaded bolt.
Figure 3:
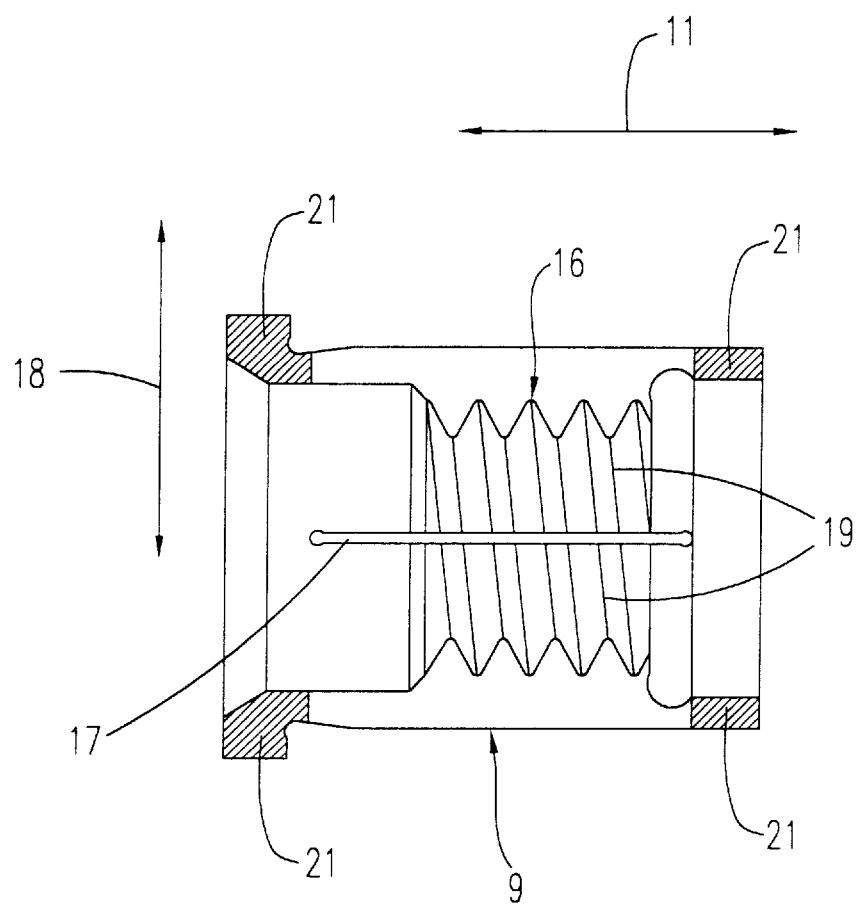
FIG. 3 a thread holder in accordance with the invention.

FIG. 2 shows the guide body 8 arranged on the left in FIG. 1, which runs in a transverse direction 11 radially to the central longitudinal axis 5 of the shank 4. Therefore, in the final mounted state, the longitudinal axis 12 of the guide body 8 runs in the transverse direction 11. The guide body 8 comprises the guide head 13 as well as the threaded bolt 14. The guide head 13 is made of a hard metal. The threaded bolt 14 is made of steel and bears the angular thread 15 on its external side. The thread holder 9 has an internal thread 16 that is designed to complement the angular thread 15 on the threaded bolt 14. The internal thread 16 is split by the longitudinal slot 17 running, in the final mounted state, in a transverse direction 11 radial to the central longitudinal axis 5 of the shank 4. Opposite this longitudinal slot 17 is a corresponding longitudinal slot 17 on the side of the thread holder 9 not shown in FIG. 3. The application of two opposite longitudinal slots 17 divides the internal thread 16 into two thread shanks 19 that can be sprung apart and expanded in the spreading direction 18.

Figures 4, 5:
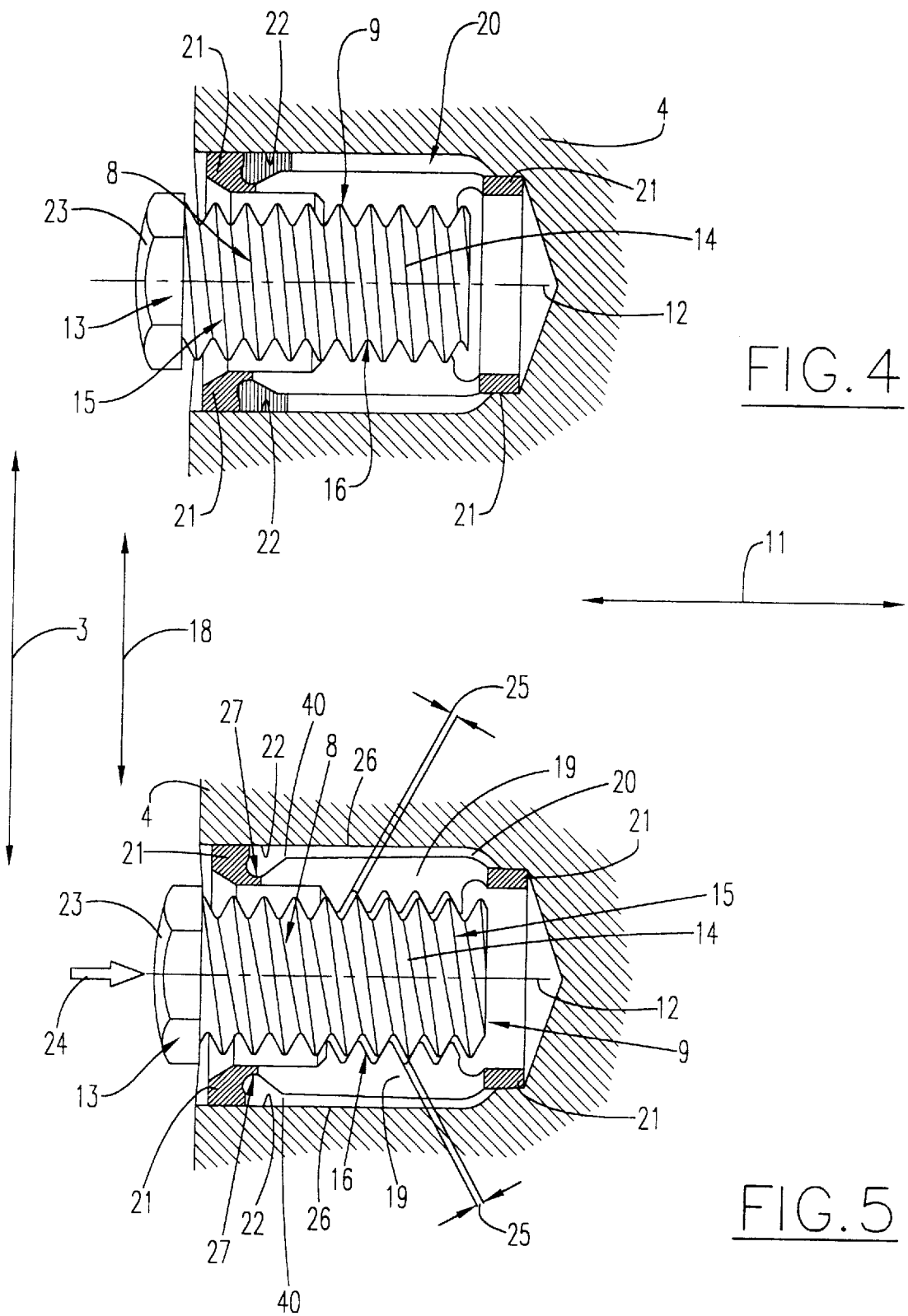
FIG. 4 the thread holder from FIG. 3 mounted in the location hole, with a screwed-in guide body from FIG. 2 without the exertion of force, FIG. 5 the thread holder from FIG. 3 mounted in the location hole, with a screwed-in guide body from FIG. 2 with the exertion of force, FIG. 6 a representation of the location hole with inserted wire body and screwed-in guide body without the exertion of force, FIG. 7 a representation of the location hole with inserted wire body and screwed-in guide body with the exertion of force, FIG. 8 a polygonal spiral thread path of the wire insert shown in FIG. 6 and FIG. 7.

In the final mounted stage, the thread holder 9 lies in the location hole 20 in the shank 4. The location hole 20 runs in the transverse direction 11. The thread holder 9 lies in the final mounted stage with its locating faces 21 on the bore internal walls 22 of the location hole 20. In the final mounted stage, the longitudinal slot 17 of the thread holder 9 not shown in FIG. 4 and FIG. 5 as well as the longitudinal axis of the guide body 12 run in a transverse direction 11 such that the expansion direction 18 for the thread holder 9 inserted into the location hole 20 is congruent with the lengthwise direction 3. In FIG. 4, the guide body 8 is screwed into the internal thread 16 of the thread holder 9, into the position it is supposed to be in, with the angular thread 15 of the threaded bolt 14. When the bore tool 1 is lying in the bore hole to be processed, the guide head 15 attached to the threaded bolt 14 slides with its guide surface 23 along the internal wall of the bore to be processed and thereby supports the bore tool 1 on the bore internal wall not shown in the drawings and also guide it. If the guide surface 23 slides over an inaccuracy of the bore internal wall that is not shown, a radial force 24 is exercised on the guide body 8. As a result of the radial force 24 operating on the guide head 13 via the guide surface 23, the guide body 8 is moved from its starting or zero position shown in FIG. 4 to its spring-deflected position shown in FIG. 5. To achieve this, the thread shanks 19 of the thread holder 9 spread apart in the expansion direction 18 such that the guide body 8 can slide further into the location hole 20 in the transverse direction 11 by the extent of the spring excursion 25. The direction of the radial force 24 corresponds here to the screw-in direction of the threaded bolt 14. The spring excursion 25 is clearly visible in FIG. 5. As a result of the thread shank 19 being sprung apart, the flanks of the angular thread 15 and of the internal thread 16 move towards each other such that the thread flanks of the angular thread 15 that are facing the guide head 13 lift up from the associated thread flanks of the internal thread 16. If the exertion of radial force 24 is reduced or ended, the guide body 8 springs-back in the transverse direction 11 against the screw-in direction running in the direction of the radial force 24.

When the thread holder 9 is in the mounted state, the hollow space 27 is formed between the bore internal wall 22 and the external wall of the thread holder 26. The hollow space 27 can be completely or partially filled if necessary with a filling made of vibration-reducing material 40 as shown in FIG. 5, for example.

Figure 6:
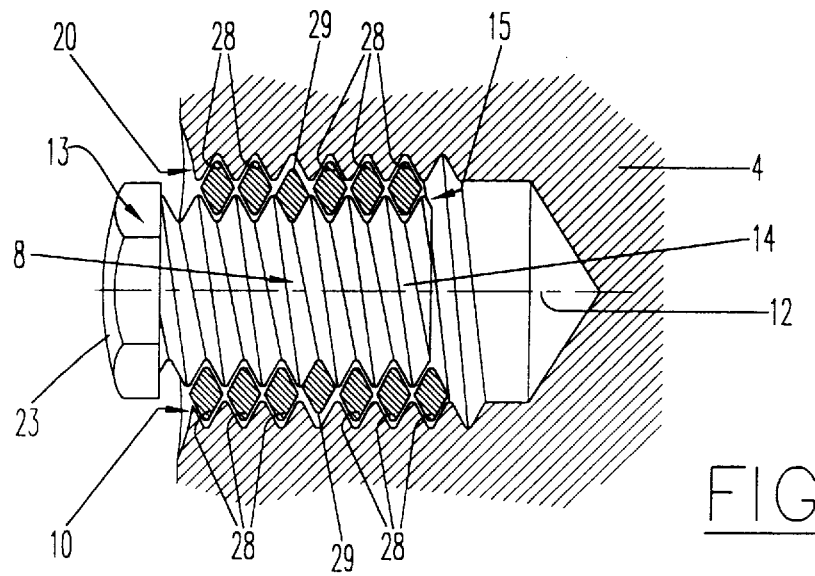

A wire insert 10 can also be used instead of the thread holder 9 (FIG. 6). The wire insert 10 comprises a plurality of wire coils 28 and has the basic contour of a spiral spring. The wire coils 28 are basically round and form the thread paths for the angular threads 15 of the threaded bolt 14 on the guide body 8. Moreover, FIG. 6 clearly shows that the internal wall of the location hole 20 has a spiral profile for fixing the wire insert 10. To this end, the flanks of the wire coil 28 that are facing away from the angular thread 15 of the threaded bolt 14 in the final mounted state lock into the profiling in the wall of the location hole 20.

Figure 7:
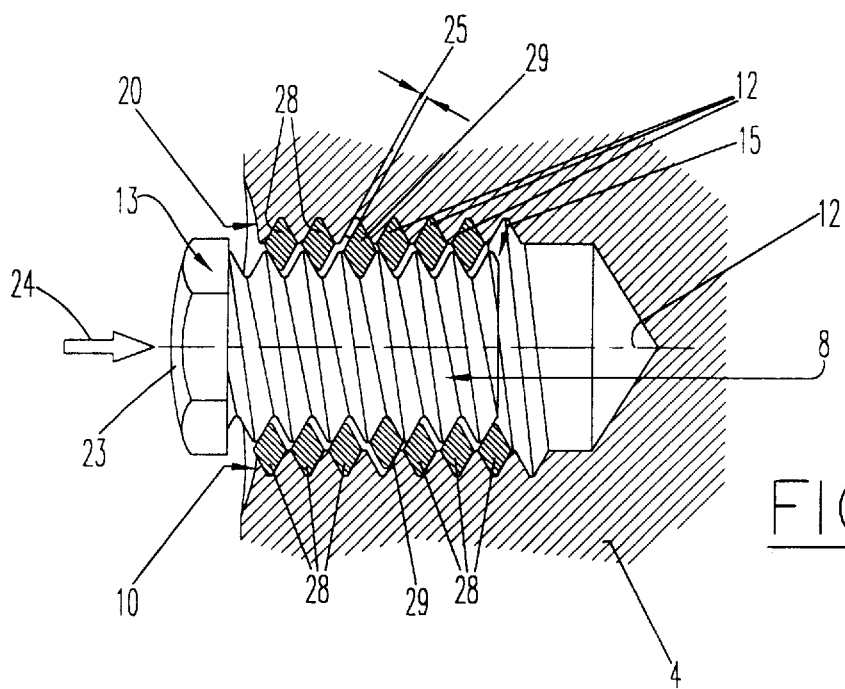

In the exemplary embodiment in FIG. 7, the guide head 13 slides again with its guide surface 23 along the bore internal wall (not shown) of the bore hole to be machined by the bore hole 1. A bump on the internal wall of the bore hole to be machined again causes a radial force 24 to be exerted in the screw-in direction of the threaded bolt 14 on the guide body 8, where the guide body 8 slides into the location hole 20 by the extent of the spring excursion 25 in the direction of the radial force 24, i.e. in a transverse direction 11.

Figure 8:
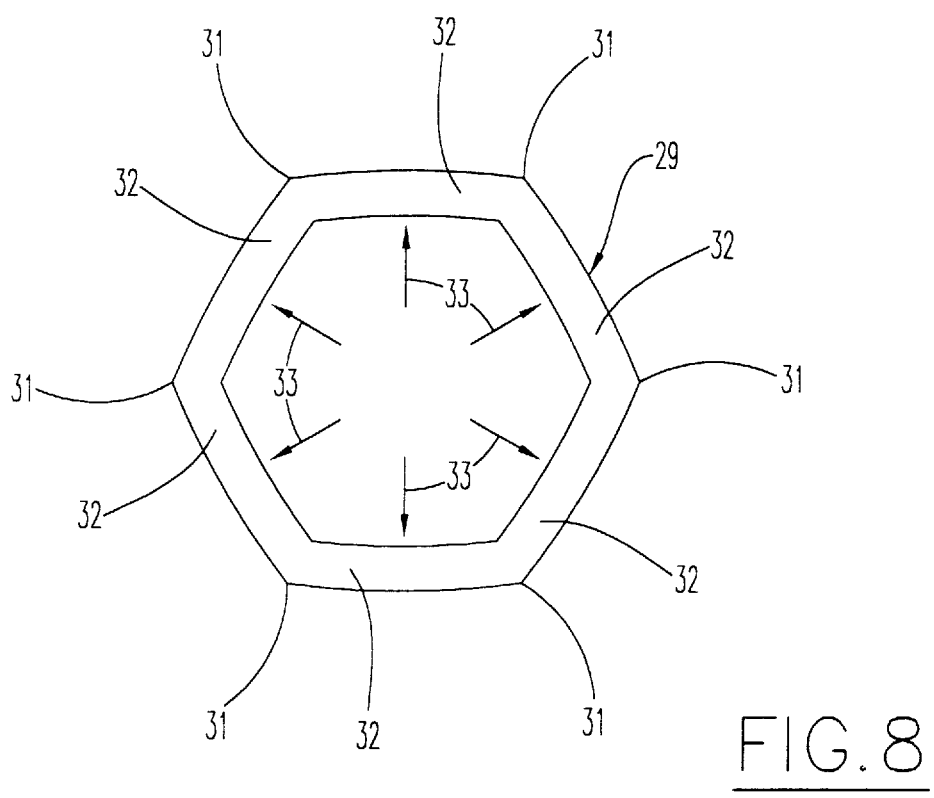

In the exemplary embodiment in FIG. 6 and FIG. 7, a wire coil 28 is designed as a polygon 29 (FIG. 8). This polygonal thread path has a plurality of polygon corners 31. The areas arranged between the polygon corners 31 form spring areas 32 operating as leaf springs. As a result of the force exerted through the radial force 24, the guide body 8 is moved into the location hole 20 by the extent of the spring excursion 25. This exertion of force causes the spring areas 32 to spring eccentrically outwards in the direction of the arrows 33. The distortion of the polygon 29 causes the spring areas 32 of the polygon 29 to absorb the radial force 24 in the manner of leaf springs. The spring direction in accordance with arrow 33 runs here centrifugal to the longitudinal axis of the guide body 12. The spring areas 32 therefore move away radially from the longitudinal axis of the guide body 12 in a spring-like manner. When the exertion of force with the radial force 24 is ended, the wire insert 10 springs-back the guide body 8 again into its original position shown in FIG. 6. The spring movement of the polygon 29 corresponds in term of function to the spreading-out spring of the thread shank 19 in the first embodiment shown with the thread holder 9.

FIG. 2 shows very clearly that a hexagon socket 34 is molded in the free end of the threaded bolt 14 in a preferred embodiment of the invention. The guide head 13 is mushroom-shaped in design. In the preferred embodiment, the "stem" of the mushroom arranged underneath the "cap" forms a hexagon insert bit 35 corresponding to the hexagon socket 34. The hexagon insert bit 35 also functions as a mounting shank for the guide head 13. The guide head 13 is simply inserted with the hexagon insert bit 35 into the hexagon socket 34. The hexagon insert bit 35 and the hexagon socket 34 are made to fit exactly together. The hexagon insert bit 35 and the hexagon socket 34 are permanently joined together through their material for long-term connection of the guide head 13 to the threaded bolt 14.

Finally, the head of the mushroom-shaped guide head 13 comprises the guide surface 23 facing away from the threaded bolt 14 and the mounting surfaces 36 running in the direction of the longitudinal axis of the guide body 12. According to the invention, the mounting surfaces form another hexagon insert bit that is larger than the hexagon insert bit 35. This larger hexagon insert bit comprising the mounting surfaces 36 operates as a mounting hexagon. A ring wrench or a fork wrench can be simply placed onto the mounting hexagon. The guide body 8 comprising the guide head 13 and threaded bolt 14 can be screwed into the internal thread 16 of the thread holder 9 or the wire coil 29 of the wire insert 10. The guide head 13 designed as a domed cap nut can therefore be used to mount and dismount and also to set and adjust the guide body 8. The guide head 13 has therefore the secondary function of a mounting head.

It is claimed:

1. A guide element for a cutting tool, the cutting tool including a tool holding fixture and a shank with at least one cutting edge thereon, the guide element comprising:

a location hole extending into the shank;

an expandable thread holder insertable into the location hole and having an internal thread therein; and a guide body having a threaded bolt with a guide head on an outermost end thereof, the threaded bolt having an external thread thereon, the threaded bolt being threadable into the internal thread of the expandable thread holder and being capable of forcible movement inward in the screw-in direction without threaded movement based upon expansion of the expandable thread holder in response to an inward force on an outermost face of the threaded bolt.

2. The guide element in accordance with claim 1, including the longitudinally slotted thread holder having an angular thread as the internal thread.

3. The guide element in accordance with claim 2, including two longitudinal slots in the thread holder opposite each other and running in the screw-in direction of the location hole and threaded bolt, said longitudinal slots forming two opposite spring-mounted expandable thread shanks on the thread holder.

4. The guide element in accordance with claim 3, including a plurality of longitudinal slots in the thread holder running in the screw-in direction of the threaded bolt, said longitudinal slots forming a plurality of opposite spring-mounted expandable thread shanks on the thread holder.

5. The guide element in accordance with claim 3, whereby when the threaded bolt is screwed in, the thread shanks that form a prestress on the thread holder are slightly spread apart in order to form a frictional force that self-locks the threaded bolt.

6. The guide element in accordance with claim 5, whereby the prestressed thread shanks are expandable in the screw-in direction when force is exerted into the thread bolt in order to strain the thread holder and to allow the threaded bolt to travel longitudinally in the push-in direction.

7. The guide element in accordance with claim 3, whereby between an internal wall of the location hole and the external wall of the thread holder, a hollow space that is created when the thread holder is inserted is filled up with a vibration-reducing material.

8. The guide element in accordance with claim 1, whereby the expandable thread holder includes a spiral-shaped wire insert insertable into the location hole, the spiral threads of said wire insert forming the internal threads.

9. The guide element in accordance with claim 8, whereby the spiral threads can slide opposite each other in a spring-elastic manner in the screw-in direction of the threaded bolt.

10. The guide element in accordance with claim 8, whereby at least one spiral thread is in the shape of a polygon so as to form a plurality of spring areas, each being arranged between two adjacent polygon corners and operating as radial leaf springs.

11. The guide element in accordance with claim 10, whereby a spiral-shaped inner profile of an internal wall of the location hole so as to positively fix the wire insert.

12. The guide element in accordance with claim 1, including a bore hole molded into a free end of the threaded bolt and a corresponding outer profile on a mounting shank of the guide head so to fix the guide head onto the threaded bolt.

13. The guide element in accordance with claim 12, whereby the guide head is made of mechanically resistant material, and the guide head is designed to complement a mounting tool.

14. The guide element in accordance with claim 13, whereby the guide head is designed as a hexagon-shaped cap nut shank having a hexagon insert bit as a contact point for a commercially available wrench and a preferably rounded guide surface.

15. The guide element in accordance with claim 9, whereby at least one spiral thread is in the shape of a polygon so as to form a plurality of spring areas, each being arranged between two adjacent polygon corners and operating as radial leaf springs.

16. The guide element in accordance with claim 9, including a spiral-shaped inner profile of the internal wall of the location hole so as to positively fix the wire insert.

17. The guide element in accordance with claim 10, including a spiral-shaped inner profile of the internal wall of the location hole so as to positively fix the wire insert.

18. A guide element for a cutting tool, the cutting tool including a tool holding fixture and a shank with at least one cutting edge thereon, the guide element comprising:

a location hole radially extending into the shank and having an internal wall;

an expandable thread holder insertable into the location hole and having at least a portion thereof including an internal thread and being radially expandable; and a guide body having an externally threaded shaft with a guide head thereon, the threaded shaft being threadable into the internal thread of the expandable thread holder, and the threaded shaft being capable of forcible movement inward in the screw-in direction without threaded movement based upon radial expansion of the expandable thread holder in response to an inward force on an outermost face of the threaded bolt.

19. The guide element in accordance with claim 18 wherein the expandable thread holder includes locating faces approximate its innermost and outermost ends and in contact with the internal wall when the holder is within the location hole, and having the internal thread on the holder in between the locating faces where the holder is expandable along the internal thread.

20. The guide element in accordance with claim 18 wherein the expandable thread holder is a spiral-shaped wire insert having spiral threads that form the internal thread.

* * * * *